(12) United States Patent
Brase

(10) Patent No.: US 7,527,735 B2
(45) Date of Patent: May 5, 2009

(54) SYSTEM FOR TREATING WASTEWATER

(75) Inventor: Craig S. Brase, Owatonna, MN (US)

(73) Assignee: Skyblue Waters USA, Inc., Colorado Springs, CO (US)

( * ) Notice: Subject to any disclaimer, the term of this patent is extended or adjusted under 35 U.S.C. 154(b) by 79 days.

(21) Appl. No.: 11/507,124

(22) Filed: Aug. 21, 2006

(65) Prior Publication Data

US 2007/0045180 A1 Mar. 1, 2007

Related U.S. Application Data

(60) Provisional application No. 60/710,699, filed on Aug. 23, 2005.

(51) Int. Cl.
*C02F 3/00* (2006.01)
(52) U.S. Cl. .................................................... 210/605
(58) Field of Classification Search ................ 210/605, 210/630, 620–624
See application file for complete search history.

(56) References Cited

U.S. PATENT DOCUMENTS

| | | |
|---|---|---|
| 3,699,776 A | 10/1972 | LaRaus |
| 3,772,187 A | 11/1973 | Othmer |
| 3,864,246 A | 2/1975 | Casey et al. |
| 3,911,064 A | 10/1975 | McWhirter et al. |
| 3,939,068 A | 2/1976 | Wendt et al. |
| 3,973,043 A | 8/1976 | Lynn |
| 4,042,494 A | 8/1977 | Stoyer |
| RE29,781 E | 9/1978 | McWhirter |
| 4,163,712 A | 8/1979 | Smith |
| 4,192,742 A | 3/1980 | Bernard et al. |
| 4,199,452 A | 4/1980 | Mandt |
| 4,210,680 A | 7/1980 | Dawson et al. |
| 4,257,897 A | 3/1981 | Krichten et al. |
| 4,337,152 A | 6/1982 | Lynch |
| 4,340,484 A | 7/1982 | Pollock et al. |
| 4,384,956 A | 5/1983 | Mulder |
| 4,415,452 A | 11/1983 | Heil et al. |
| 4,419,243 A | 12/1983 | Atkinson et al. |

(Continued)

FOREIGN PATENT DOCUMENTS

WO    WO 96/20138    7/1996

OTHER PUBLICATIONS

Field, "Anaerobic Biotechnologies", Apr. 25, 2002, updated Apr. 17, 2003, pp. 1-8.

(Continued)

*Primary Examiner*—Chester T Barry
(74) *Attorney, Agent, or Firm*—Kinney & Lange, P.A.

(57) ABSTRACT

A system for treating wastewater capable of removing granules from treated wastewater comprises a source of activated sludge for promoting anaerobic and aerobic digestion of wastewater; a compressor for supplying a volume of pressurized air for promoting aerobic digestion of wastewater; at least one anaerobic reactor for anaerobically treating wastewater with the activated sludge and at least one aerobic reactor for aerobically treating wastewater with the activated sludge and pressurized air, thereby producing additional activated sludge material containing granules; a pump for circulating wastewater through the system; a pressure control system for regulating pressure in the system; a discharge system for removing treated wastewater and activated sludge from an anaerobic and an aerobic reactor; and a filter for removing the granules from the additional activated sludge.

16 Claims, 12 Drawing Sheets

U.S. PATENT DOCUMENTS

| | | |
|---|---|---|
| 4,488,967 A | 12/1984 | Block et al. |
| 4,501,664 A | 2/1985 | Heil et al. |
| 4,522,722 A | 6/1985 | Nicholas |
| 4,582,600 A | 4/1986 | Atkinson et al. |
| 4,645,603 A | 2/1987 | Frankl |
| 4,674,888 A * | 6/1987 | Carlson ............... 366/337 |
| 4,681,688 A * | 7/1987 | Sondov et al. ......... 210/770 |
| 4,749,494 A | 6/1988 | Tomoyasu et al. |
| 4,845,034 A | 7/1989 | Menger et al. |
| 4,867,883 A | 9/1989 | Dagger et al. |
| 4,999,111 A | 3/1991 | Williamson |
| 5,087,378 A | 2/1992 | Kovacs |
| 5,137,636 A | 8/1992 | Bundgaard |
| 5,167,806 A | 12/1992 | Wang et al. |
| 5,213,681 A | 5/1993 | Kos |
| 5,342,522 A | 8/1994 | Marsman et al. |
| 5,380,438 A | 1/1995 | Nungesser |
| 5,545,326 A * | 8/1996 | Petering ............... 210/605 |
| 6,413,427 B2 | 7/2002 | Tipton et al. |
| 7,060,186 B2 | 6/2006 | Petering |
| 2002/0104798 A1 | 8/2002 | Takechi et al. |
| 2002/0117444 A1 | 8/2002 | Mikkelson et al. |
| 2002/0162795 A1 | 11/2002 | Pollock |
| 2003/0080055 A1 | 5/2003 | Gross |
| 2004/0011736 A1 | 1/2004 | Ishikawa et al. |
| 2004/0035770 A1 | 2/2004 | Edwards et al. |
| 2005/0056588 A1 | 3/2005 | Petering |

OTHER PUBLICATIONS

"Making ATP", Jun. 1, 2002, pp. 1-3.

Mancl, "Wastewater Treatment Principles and Regulations", Feb. 11, 2005, pp. 1-5.

Ammary, "Nutrients requirements in biological industrial wastewater treatment", African Journal of Biotechnology vol. 3 (4), Apr. 2004, pp. 236-238.

* cited by examiner

SYSTEM FOR TREATING WASTEWATER

CROSS-REFERENCE TO RELATED APPLICATION(S)

The present application claims the benefit of provisional Application No. 60/710,699, filed Aug. 23, 2005 by Craig Brase, entitled "System and Method for Treating Wastewater" according to 35 U.S.C. § 119(e), which is incorporated by reference in its entirety.

BACKGROUND OF THE INVENTION

Wastewater treatment has been and continues to be a matter of great environmental importance, including issues relating to municipal sewage or animal waste streams. Traditionally, organic matter containing excessive biological oxygen demand (BOD) has been treated using microbial action in a manner that separates the organic matter, to form a mass of solids in the form of an activated sludge, from the remainder or water fraction. The treatment problem is decidedly two-fold because the water and the sludge fractions both must be treated to be safely returned to the environment, and the two fractions may contain different impurities to be removed.

Treatment typically involves digestion of the organic material through fermentation of the sludge involving aerobic or anaerobic bacterial action or some combination thereof. These processes are used to reduce or consume the chemical oxygen demand (COD) and biological oxygen demand (BOD) of the material and reduce them to an environmentally safe level in the organic materials. It is also necessary to remove undesirable inorganic materials from the water fraction, which typically contains undesirable quantities of phosphorus and nitrogen compounds including phosphates and nitrates.

Wastewater treated by conventional wastewater treatment systems contains soluble, partially soluble and insoluble material as well as contaminates. Materials in the wastewater may be decomposable, partially decomposable or not decomposable. Wastewater treatment systems are designed to provide controlled decomposition of wastes to reduce pollution, health hazards and offensive odors.

Decomposable and partially decomposable materials are referred to as biodegradable; that is, the material maybe biologically broken down, or stabilized by bacterial action. Decomposable material is stabilized in wastewater treatment systems by bacteria, protozoa, and other microorganisms. Bacterial consumption of material, creating energy and reproducing bacterial cells, is the foundation of activated sludge wastewater treatment.

Conventional wastewater treatment systems may include pretreatment, primary treatment, secondary treatment, and advanced treatment. Pretreatment includes screening, comminuting (mechanical cleaning of screens by shredding solids to a size which can pass through screen openings), degritting, and grease and scum removal. Primary treatment includes removal of suspended solids from wastewater by clarification and skimming. This typically involves a tank or channel and the following steps: reducing flow velocity, settling heavier solids, and skimming relatively light solids. Primary treatment may include anaerobic digestion processes, aerobic digestion processes, or a combination thereof. Primary treatment systems typically include sludge collection mechanisms, sludge suction devices, grit removal devices, and sludge dewatering devices to reduce the volume of sludge to be disposed. Secondary treatment systems are typically aerobic systems including an aeration phase and a clarification phase. Secondary treatment systems typically include an aeration tank, an air distribution system, a clarifier, sludge collection mechanisms, and sludge removing devices. Advanced treatment includes further removal of suspended and dissolved organic solids by means including filtration and removal of pathogens and chloroforms by oxidation, chlorination or heating, precipitation of minerals, adsorption, or other methods. In a further process in advanced treatment, the purified liquor from the clarifier is typically filtered and refined through chlorination, oxidation, or heating.

In the activated sludge process of primary or secondary treatment, microorganisms are contained in an activated sludge and mixed with incoming wastewater; the wastewater providing food for the microorganisms whereby more activated sludge is produced. Such mixing is accomplished in an aeration tank or channel. In the aerobic activated sludge process, oxygen is intrinsicly mixed with the activated sludge and the wastewater. The microorganisms convert suspended organic solids into energy, carbon dioxide, water, and additional microorganism cells. The aerobic activated sludge process therefore typically includes mixing of wastewater, activated sludge, and oxygen in an aeration tank; consumption of suspended organic solids by bacteria; settling of activated sludge in a clarifier; returning the activated sludge to the aeration tank for further treatment; removing purified liquor from the clarifier; and removing and disposing of the final, inert sludge.

Existing processes and installations for the treatment of such residential and community wastes have generally been large scale operations having installation costs measured in terms of millions of dollars such as associated with typical municipal treatment plants. There exists a need to provide a compact, low-cost system and method for treating wastewater from residential and community sources. There also exists a need for a portable, modular wastewater system.

BRIEF SUMMARY OF THE INVENTION

A system for treating wastewater capable of removing granules from treated wastewater comprises a source of activated sludge for promoting anaerobic and aerobic digestion of wastewater; a compressor for supplying a volume of pressurized air for promoting aerobic digestion of wastewater; at least one anaerobic reactor for anaerobically treating wastewater with the activated sludge and at least one aerobic reactor for aerobically treating wastewater with the activated sludge and pressurized air, thereby producing additional activated sludge material containing granules; a pump for circulating wastewater through the system; a pressure control system for regulating pressure in the system; a discharge system for removing treated wastewater and activated sludge from an anaerobic and an aerobic reactor; and a filter for removing the granules from the additional activated sludge.

DETAILED DESCRIPTION

Figure 1:
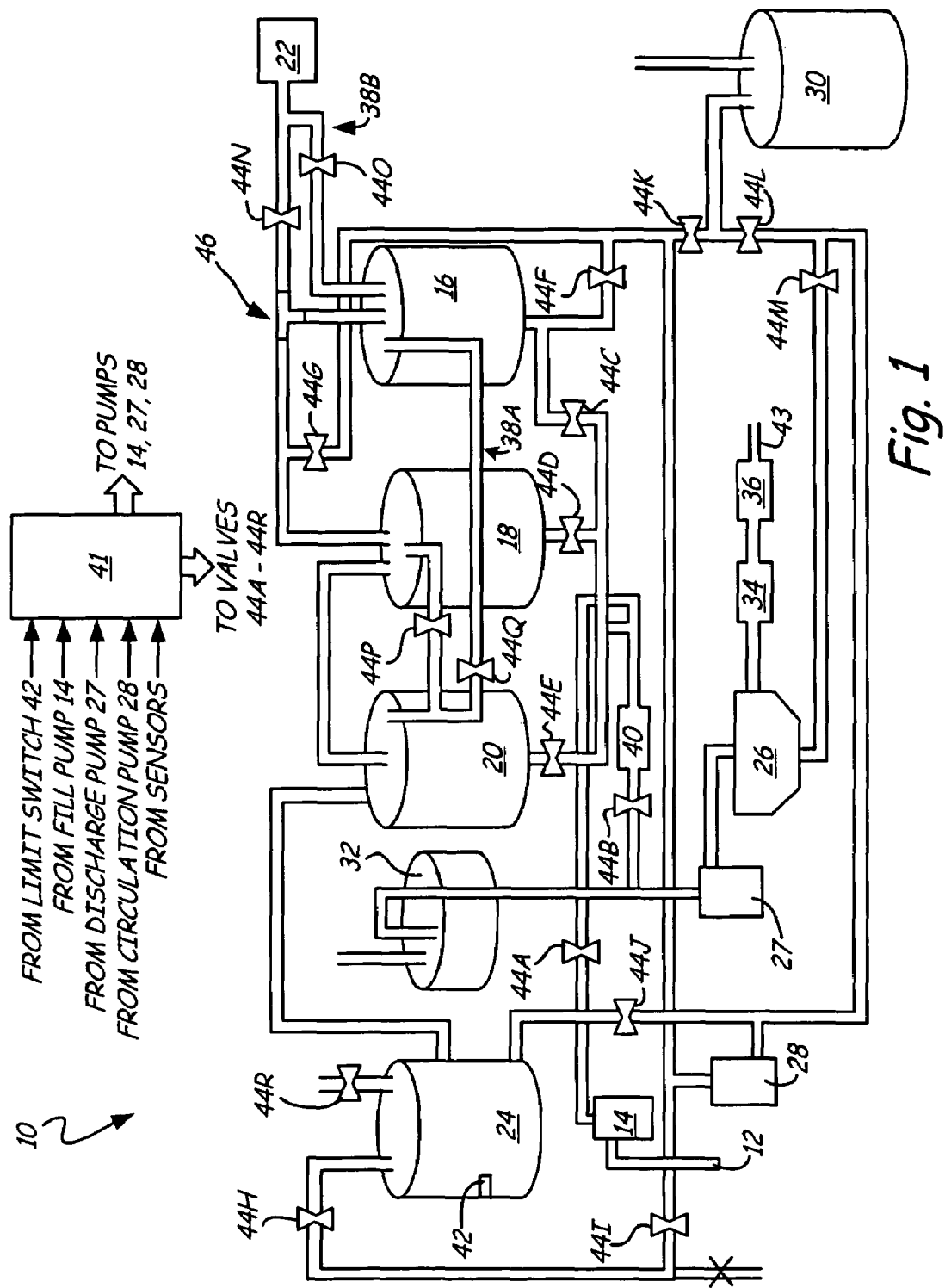
FIG. 1 is a diagram of one embodiment of the wastewater treatment system of the present invention.

FIG. 1 shows one embodiment of the system of the present invention. FIG. 1 is intended to be representative of a system that can be used to perform the process but is presented by way of example and by no means with any intention to limit the scope of either the process or the types of systems capable of performing it. Placement and use of components such as valves are discernible by those skilled in the art. FIG. 1 shows a schematic of system 10 having supply line 12, fill pump 14, anaerobic reactor 16, first aerobic reactor 18, second aerobic reactor 20, compressor 22, vapor tank 24, clarifier 26, discharge pump 27, circulation pump 28, sludge tank 30, surge tank 32, chlorinator 34, dechlorinator 36, ventilation systems 38A and 38B, filter 40, programable logic controller (PLC) 41, limit switch 42, exit 43 and valves 44A through 44R. Also shown is injector section 46 of anaerobic reactor 16. System 10 can also be equipped with various sensors that are used in conjunction with PLC 41 for controlling the flow of wastewater through the system. Such sensors might include pressure sensors, flow meters and oxygen demand sensors.

The present invention provides a process together with a compact, low-cost wastewater treatment system. The process is particularly suited to treat wastewater material from sources such as residences and businesses. Influent wastewater obtained from a direct connected flushing system for one or more sources of wastewater such as residences or businesses is connected to system 10 at inlet 12.

The system and method remove up to about 98% of the BOD and up to about 60% of the phosphates from the wastewater. The method for treating wastewater includes an aerobic step in which BOD is metabolized in aerobic reactors 18 and 20, and an anaerobic step in which phosphorous is metabolized or resorbed in anaerobic reactor 16. The present invention utilizes a continuous source of active biological cultures from sludge tank 30 for processing the wastewater. This system uses a bubble flow technique in which a high surface area of high oxygen content air is infused at injector section 46 into a stream of circulated wastewater. The entire biomass is mixed and circulated through anaerobic reactor 16, aerobic reactors 18 and 20 and vapor tank 24. The system is maintained at an elevated pressure, and gas is vented from system 10 through vapor tank 24 as needed to maintain pressure. Granules of phosphates, nitrates and ammonia that formed in the sludge during the anaerobic and aerobic reaction processes are screened out by filter 40. Treated liquid and solid materials are separated at clarifier 26 where liquids are further processed for removal from system 10 and activated sludge solids are recycled into sludge tank 30.

In one embodiment, the system is operable in six cycles: charge, fill, run, bypass, degassing and discharge. In the charge cycle, system 10 is charged with activated sludge from sludge tank 30. This ensures there is enough active bacteria in the system for reacting the wastewater. In the fill cycle, influent wastewater from an outside source is introduced to the system 10 through supply line 12. In the run cycle, the influent wastewater and the sludge is cycled through anaerobic reactor 16, first aerobic reactor 18, second aerobic reactor 20 and vapor tank 24 by circulation pump 28 in order to allow bacteria to digest high BOD organic material. In the bypass cycle, the influent wastewater and sludge is continually circulated through first aerobic reactor 18, second aerobic reactor 20 and vapor tank 24, bypassing anaerobic reactor 16. Anaerobic reactor 16 is closed off from the circulating wastewater in order to allow bacteria to digest phosphorus present in the wastewater. In the de-gassing cycle, excess pressure from the system is vented through vapor tank 24 and ventilation systems 38A and 38B. In the discharge cycle, properly treated wastewater is removed from system 10 in solid and liquid form through surge tank 32 and clarifier 26, returning newly created activated sludge to sludge tank 30. After a discharge cycle, additional influent wastewater can be added to the system through supply line 12 and new activated sludge can be added to anaerobic reactor 16 from sludge tank 30.

Figure 2:
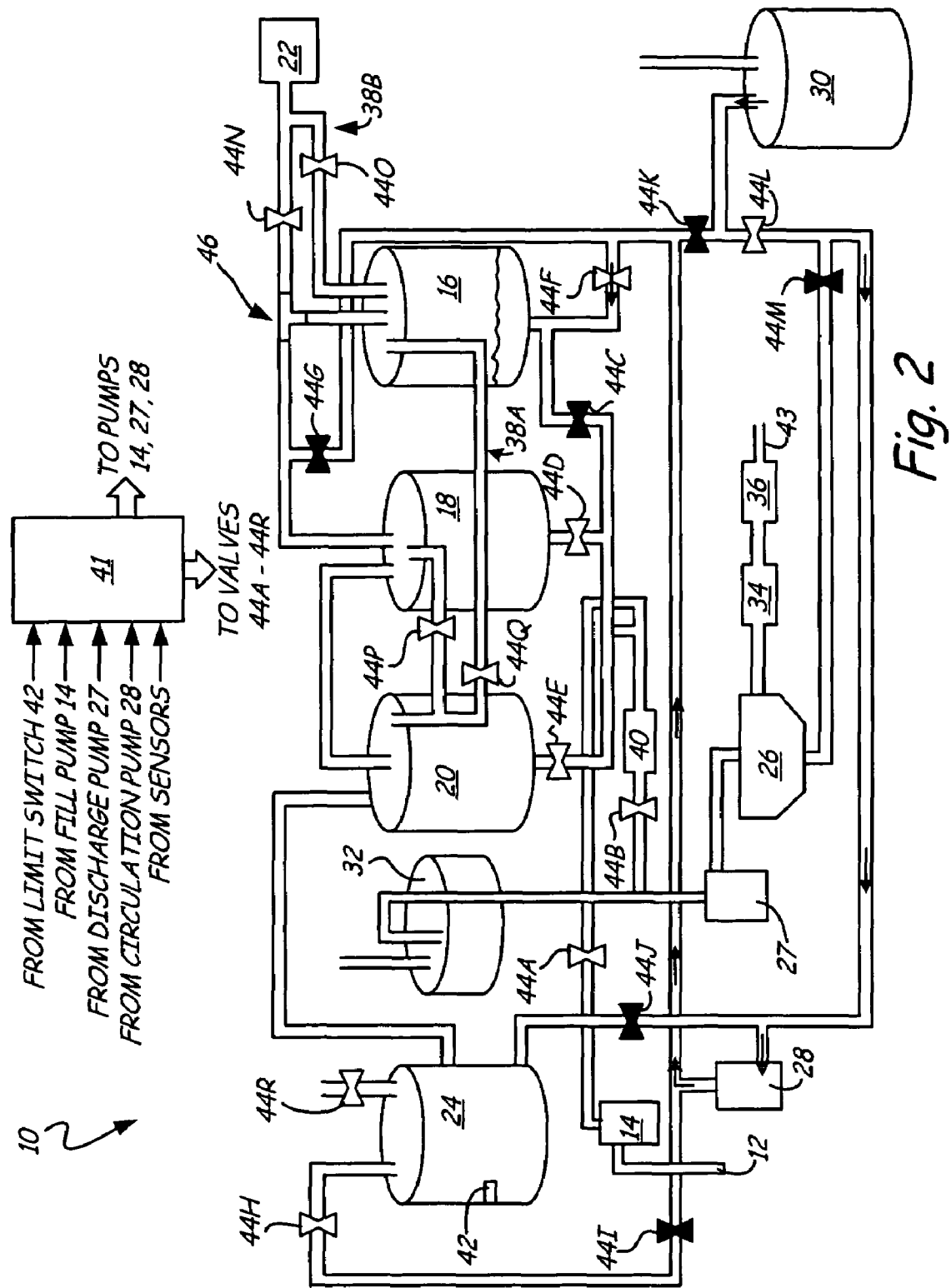
FIG. 2 is a diagram showing the charge cycle of the wastewater treatment system.

FIG. 2 shows the charge cycle of system 10. Before influent wastewater is added to the system, activated sludge from sludge tank 30 is pumped into anaerobic reactor 16 using circulator pump 28. In one embodiment, pump 28 is activated for about 5 to about 10 seconds. The inflow of activated sludge is shown in FIG. 2 with arrows. Valves 44K, 44M, 44I and 44J are closed to allow circulator pump 28 to draw in activated sludge through open valve 44L. Sludge is then pumped through valve 44F into anaerobic reactor 16. The presence of activated sludge in the system before circulation begins, ensures that there is sufficient biological activity in the system to decompose the organic matter containing excessive BOD. Both the anaerobic and aerobic steps are performed utilizing the same naturally occurring heterotropic bacteria which become conditioned to withstand high pressures and temperatures up to about 150° F. (65° C.). In one embodiment, a ratio of activated sludge to influent wastewater ranges between 1:1 and 1:15. In one embodiment, the activated sludge that is added to anaerobic reactor 16 has an age of at least about five days to sustain the nitrobacteria and nitrosomonas that enable system 10 to convert unincorporated ammonia ($NH_3$) into nitrites ($NO_2$). The nitrite is later converted to nitrate ($NO_3$). Nitrogen ($N_2$) is stripped and released by the continuous alternating anaerobic and aerobic action that occurs during processing of the wastewater.

Figure 3:
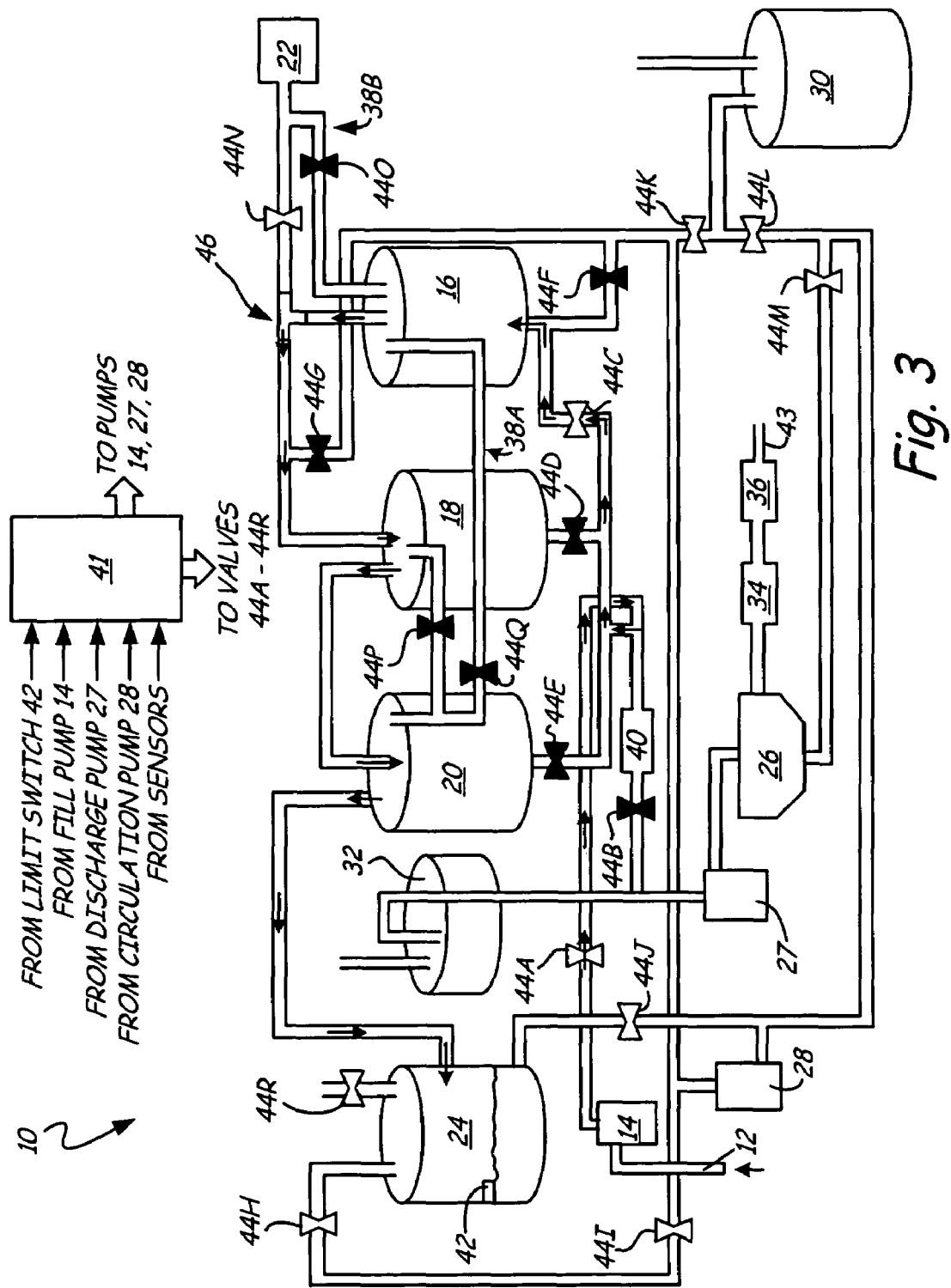
FIG. 3 is a diagram showing the fill cycle of the wastewater treatment system.

FIG. 3 shows the fill cycle of system 10. After activated sludge is added to system 10, raw wastewater is added to system 10 through inlet 12 using fill pump 14. Influent wastewater from a community or neighborhood sewage system discharge pipe or other source of wastewater is connected to inlet 12. Influent wastewater is shown in FIG. 3 with arrows. Influent wastewater is pumped through open valves 44A and 44C by fill pump 14 into anaerobic reactor 16. Valves 44B, 44D, 44E and 44F are closed to direct wastewater into anaerobic reactor 16. Valve 44G is also closed to direct wastewater into aerobic reactor 18, aerobic reactor 20 and vapor tank 24. During the fill cycle, system 10 is not open to the atmosphere and valves 44O, 44P and 44Q of ventilation systems 38A and 38B are closed. Typically, the total volume in aerobic tanks 18 and 20 is large compared to the volume in anaerobic tank 16. In one embodiment, the filling of reactors 16, 18 and 20 is indicated by level indicators. Vapor tank 24 contains limit switch 42 which controls fill pump 14. Once vapor tank 24 becomes approximately half full, limit switch 42 is tripped and fill pump 14 shuts off. The system is now ready to be cycled for treatment of the wastewater.

In one embodiment, the influent wastewater contains up to about 10% solid organic waste and is optionally conditioned in a pretreatment step as by emaciating or pulverizing. In one embodiment, devices such as emaciators and screens (not shown) are provided to chop or otherwise divide up and filter the solids in the material to be carried from the community or neighborhood sewage system prior to entry into inlet 12, such that only pulverized entrained solids are contained in the influent stream moved by fill pump 14 or circulation pump 28. This prevents the build up of solids on screens or filters and prevents line blockage from hulls and fibers and other non-digestible material contained in the solids. Continued circulation of the wastewater further breaks up solid particles.

In one embodiment, fill pump 14 has a relatively high flow volume to expedite the filling or charging of system 10. In one embodiment, pump 14 is a chopper pump and has associated emaciating capabilities to divide solid material. The material pumped by pump 14 is in the form of a sludge containing finely divided active solids plus extraneous solid material carried along in the flow. One embodiment of the invention also includes a flow controller and reverse flow-preventing shut-off valve, which is typically a solenoid valve. The flow controller and reverse flow-preventing shut-off valve cooperate to produce a controlled pressurized feed stream. In one embodiment, fill pump 14 operates at about 1750 rpm.

Figure 4A:
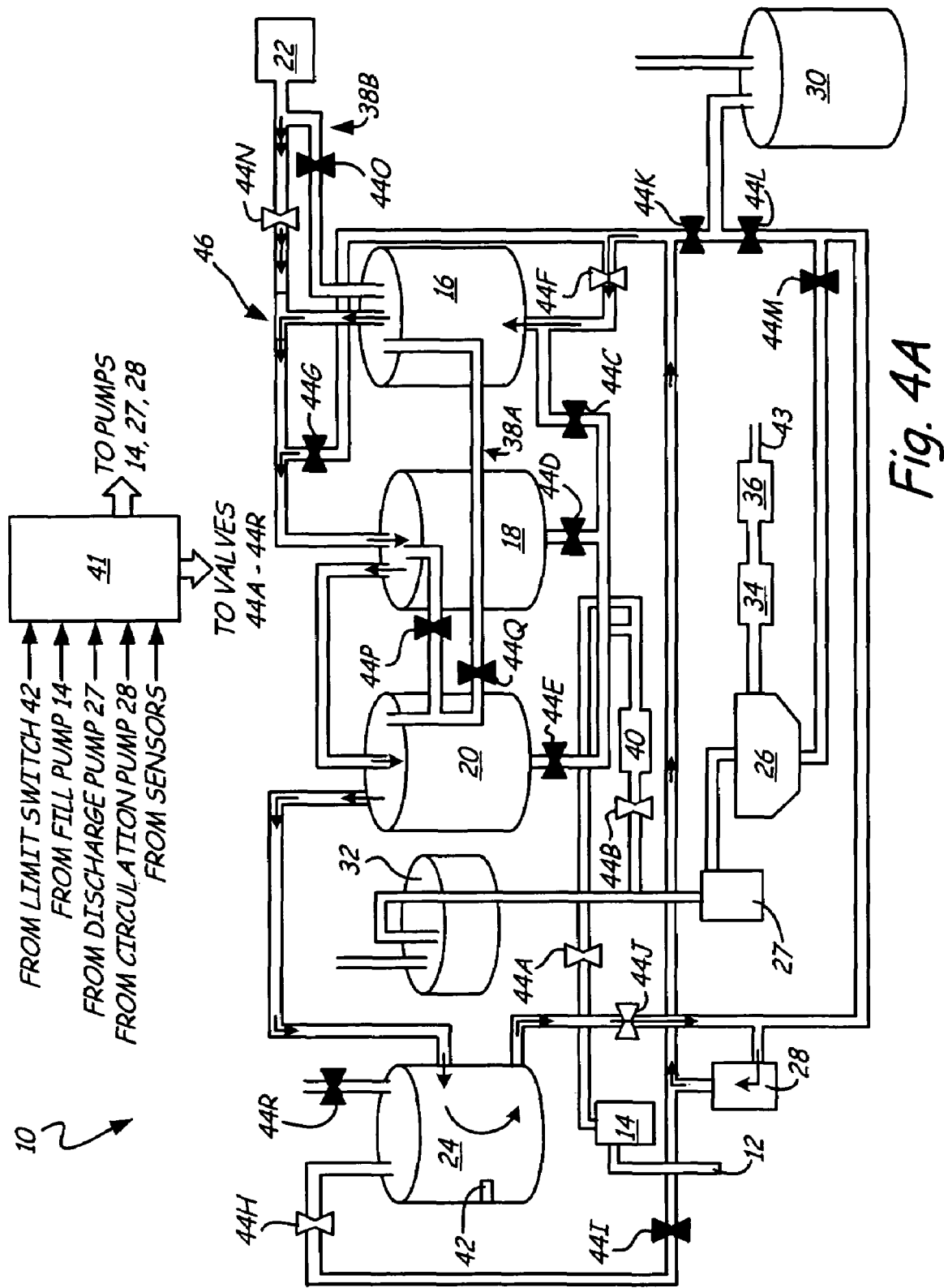
FIG. 4A is a diagram showing the run cycle of the wastewater treatment system.

FIG. 4A shows the run cycle of system 10. In the run cycle, wastewater is continually cycled through anaerobic reactor 16, first aerobic reactor 18, second aerobic reactor 20 and vapor tank 24 by circulation pump 28. Circulated wastewater is shown with arrows in FIG. 4. The circulation ensures mixing of the influent wastewater with activated sludge provided to anaerobic reactor 16 during the charge cycle. Valves 44K, 44L, 44G, 44I and 44M are closed to allow cycling through anaerobic reactor 16, aerobic reactors 18 and 20 and vapor tank 24. As wastewater enters aerobic reactor 18, valve 44N is opened to allow high oxygen content air supplied by compressor 22 to be infused with the flow of wastewater through injector section 46, thus creating an aerated flow of wastewater. This is indicated in FIG. 4 with double arrows. The aerated wastewater is charged with a supply of oxygen and is ready for aerobic treatment in aerobic reactors 18 and 20. During the run cycle, valves 44O, 44P and 44Q of ventilation systems 38A and 38B and valve 44R of vapor tank 24 remain closed to allow the pressure in system 10 to rise to the desired level. Valves 44C, 44D and 44F remain closed in order to circulate wastewater through anaerobic reactor 16 and aerobic reactors 18 and 20. Throughout circulation, bacteria of the activated sludge in first aerobic reactor 18 and second aerobic reactor 20 progressively digest the high BOD organic material in the circulated wastewater utilizing the oxygen from the infused air. While two aerobic reactors 18 and 20 are shown, additional reactors can be provided in other embodiments to handle additional material or further reduce BOD. During the run cycle, anaerobic reactor 16 also aerobically treats the wastewater.

Vapor tank 24 further includes a vent valve 44R which can be operated to vent in a pulsing degassing manner that maintains a desired operating pressure during the run and bypass cycles or can be opened to atmospheric pressure, such as during the charging and discharging portions of the cycle. In this embodiment, excess gas is discharged from system 10 via vapor tank 24, which releases the necessary amount of gas to atmosphere and maintains the desired system pressure. When system pressure reaches about 87-89 psi, vapor tank 24 opens the vent valve for about 3-5 min in order to let off about 15 to about 20 psi of pressure. Then, compressor 22 is run to resupply the vented air. The compressed air utilized for an approximately 3 gpm wastewater feed sized system is nominally about 40 scfm incoming air. The volumetric content of air in the circulating stream of system 10 is generally between about 1% and about 15%. In one embodiment, vapor tank 24 includes a deflector in order to direct circulated wastewater away from release valve 44R.

In one embodiment, anaerobic reactor 16 utilizes ported pipe 48 (shown in FIG. 4B) in air injector section 46 to maximize the amount of compressed air that is dissolved into the wastewater stream, which helps maximize digestion of the absorbed BOD. Also, in one embodiment, aerobic reactors 18 and 20 use a mixer, such as standpipe 50 (shown in FIG. 4C) or a draft tube, which also aids in dissolving the oxygen.

Figure 4B:
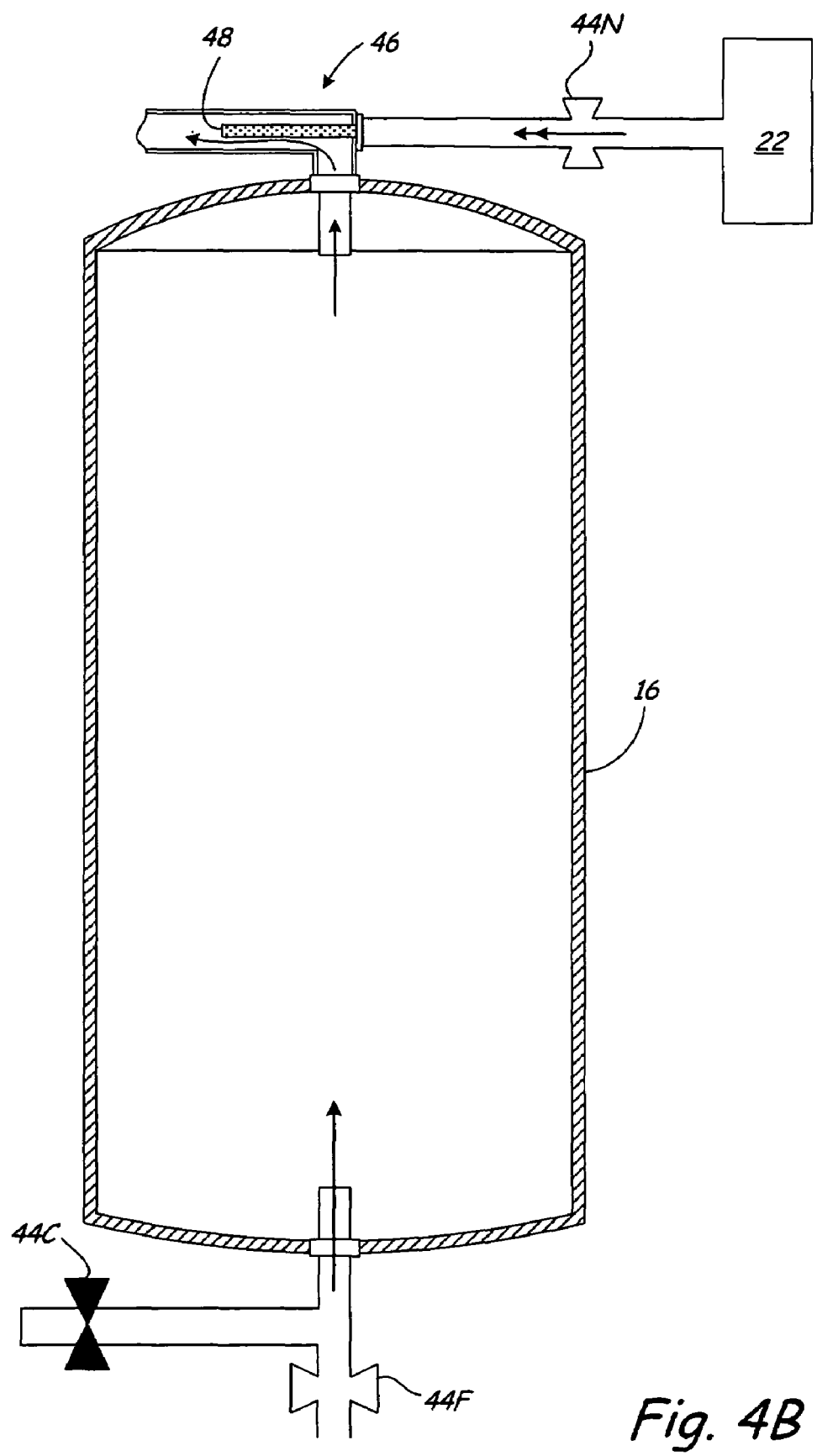
FIG. 4B shows a cross sectional view of one embodiment of an anaerobic reactor of the present invention.

FIG. 4B shows anaerobic reactor 16 and air injector section 46. The flow of wastewater through anaerobic reactor 16 is shown in FIG. 4B with arrows. For simplicity, ventilation systems 38A and 38B have been omitted. Compressor 22 supplies high oxygen content air into system 10 through valve 44N connected to anaerobic reactor 16. The flow of air into the stream of wastewater exiting anaerobic reactor 16 is shown in FIG. 4B with double arrows. Air is introduced into system 10 through injector section 46. In one embodiment, injector 48 is a ported pipe with holes having a diameter of about 0.125 inch. Injector 48 causes air to enter the stream of wastewater in the form of small bubbles. The high number of small bubbles caused by injector 48 increases the total surface area of the bubbles entering system 10. The increased surface area of the small bubbles leads to increased efficiency in aerobic reactors 18 and 20 as the air mixes with and aerates the output wastewater material of anaerobic reactor 16. The typical residence time of material in air injection section 46 is approximately about one-half minute to about two minutes, after which, as the plug flow progresses to the top of the anaerobic reactor 16, it is transferred to aerobic reactor 18. The oxygen level is raised based on air dissolved at the pressure under which the system is operating. In one embodiment, a pressure indicating sensor is provided to maintain the pressure within system 10. The air rate is adjusted to maintain a high dissolved oxygen level for maximum oxygen uptake upon mixing and during exit from anaerobic reactor 16. The required amount is proportional to the specific oxygen uptake rate; the system is designed to maintain about 10 ppm dissolved oxygen at an uptake rate of about 100 mg of oxygen per gm of biomass per hour.

Owing to the small remaining head space in each reactor 16, 18 and 20, compressor 22 quickly pressurizes system 10. In one embodiment, air compressor 22 includes an accumulator, flow metering air control input valve, shutoff valve and water hammer prevention valve. The elevated pressure and continuous flow insure that the bubbles flowing in system 10 will remain small and that the amount of available oxygen will remain in a supersaturated condition throughout aerobic processing. In one embodiment, system 10 is maintained under a pressure preferably between about 3 and 10 atmospheres (atm) (44-147 psi); more preferably between about 5 and 7 atmospheres (70-100 psi); and most preferably at about 5.85 atmospheres (86 psi). During the run cycle, anaerobic reactor 16 is filled with the circulated mixture of partially aerobically digested influent wastewater and activated sludge in preparation for the bypass cycle.

Figure 4C:
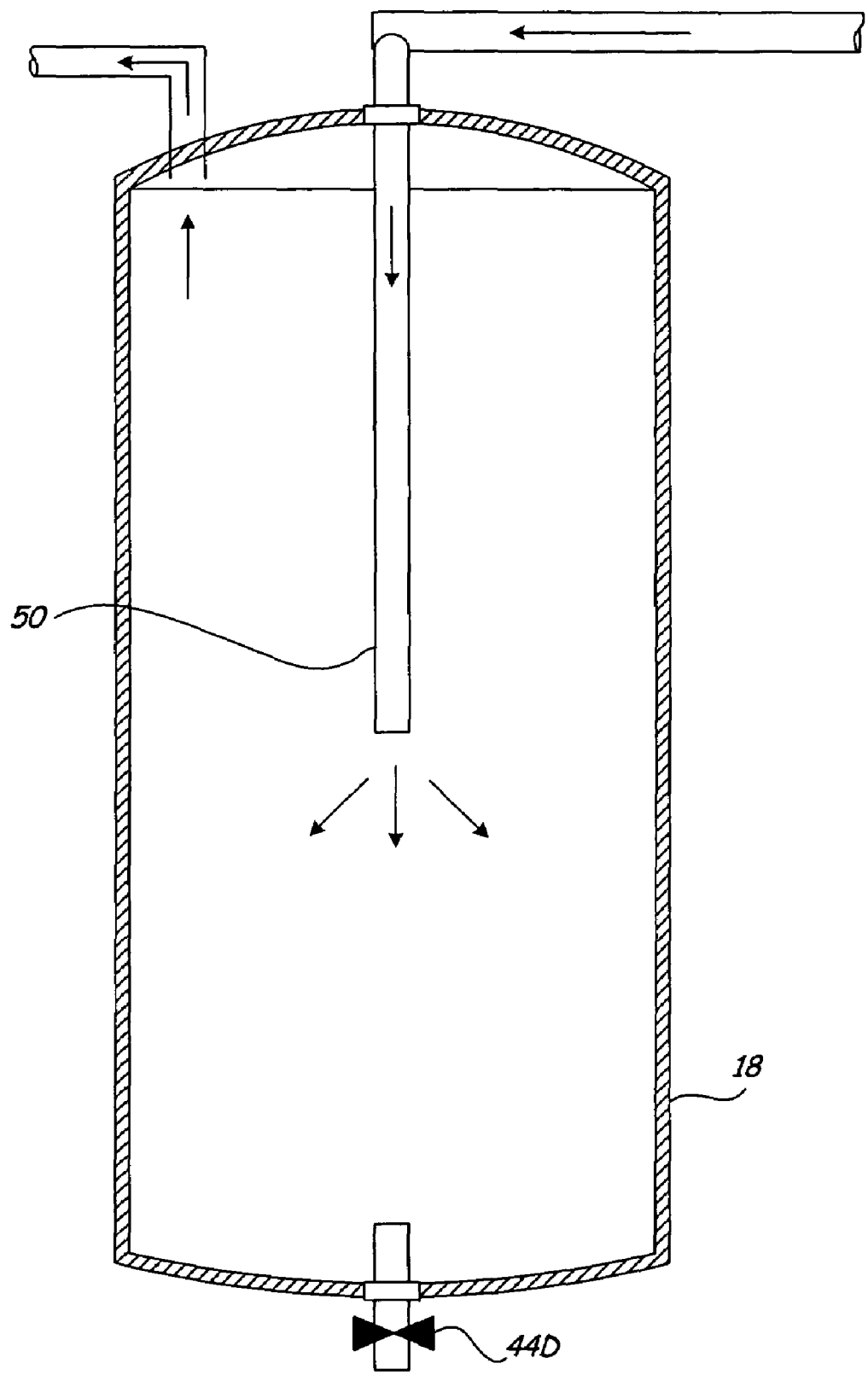
FIG. 4C shows a cross sectional view of one embodiment of an aerobic reactor of the present invention.

FIG. 4C shows the flow of wastewater through aerobic reactor 18. The flow of wastewater through aerobic reactor 18 is shown in FIG. 4C with arrows. For simplicity, ventilation systems 38A and 38B have been omitted. Anaerobically treated wastewater enters aerobic reactor 18 from anaerobic reactor 20. Bacteria received from the anoxic or anaerobic reaction in anaerobic reactor 16 are especially primed to vigorously take part in the BOD metabolism under aerobic conditions in aerobic reactors 18 and 20.

Anaerobically treated wastewater material is released close to the bottom of aerobic reactor 18 through standpipe 50. In this manner, the wastewater material containing the greatest amount of oxygen travels toward the bottom of aerobic reactor 18 and the $O_2$ content diminishes as the material moves either to the top or the bottom of aerobic reactor 18. The high rate of circulation through standpipe 50 ensures continuous churning of aerobic reactors 18 and 20. It will be appreciated that the high flow volume through standpipe 50 or a draft tube, together with the high rate of circulation and replenishment under pressure, keeps the dissolved oxygen content at or above 5 mg/l (ppm) so that a high rate of aerobic reaction may be maintained.

The infused high oxygen content air maintains relatively high dissolved oxygen content in aerobic reactors 18 and 20. A high level of dissolved oxygen is maintained so that the high phosphorus content (hpc) bacteria can digest preabsorbed fat created in the anaerobic reaction at a high respiration rate. The net amount of air used is generally about 40 scfm for a 3 gal/minute process. Moreover, the oxygen is not diffusion-limited through the cell walls of the bacteria. The small portion of the reactor fluid recycled to the anaerobic reactor 16 assures a continuous supply of sufficient bacteria to anaerobically resorb and metabolize a major portion of the phosphorus content of the feed.

Figure 5:
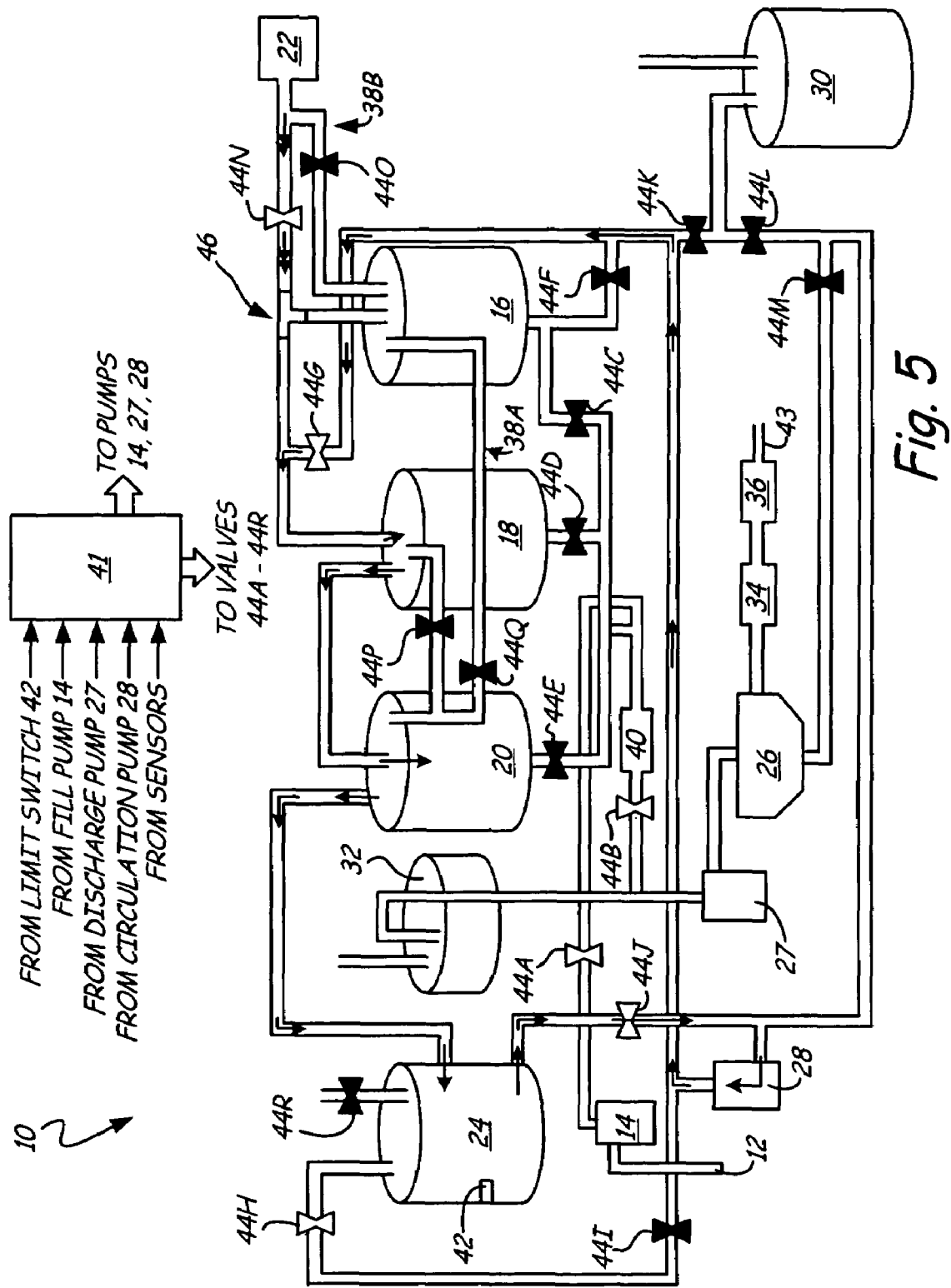
FIG. 5 is a diagram showing the bypass cycle of the wastewater treatment system.

FIG. 5 shows the bypass cycle with anaerobic reactor 16 bypassed. In this configuration, processed wastewater is continuously cycled through first aerobic reactor 18 and second aerobic reactor 20, while anaerobic reactor 16 is closed off from the circulated wastewater in order to allow bacteria to anaerobically digest phosphorous present in the wastewater inside anaerobic reactor 16. In the bypass cycle, the valves are configured in the same way as the run cycle, except valve 44G is opened and valve 44F is closed. Circulated wastewater is shown in FIG. 5 with arrows. During the bypass cycle, compressor 22 continues to supply high oxygen content air to the wastewater entering aerobic reactors 18 and 20 through injector section 46. Infused air is shown in FIG. 5 with double arrows.

In one embodiment, anaerobic reactor 16 is closed off from the run cycle for about 10 minutes at a time so that circulated wastewater is able to anaerobically decompose within anaerobic reactor 16. After the oxygen is depleted in anaerobic reactor 16, the microbes absorb and metabolize the phosphorous and develop a higher concentration of adenosine triphosphate (ATP) in the cells. This allows the bacteria to thereafter absorb large amounts of BOD and convert it directly into cell fat. The conversion to fat is an exothermic reaction that evolves approximately 20 KCAL per kg of COD which compares with the release of 480 KCAL per kg of COD for the complete metabolism of the BOD to $CO_2$ and $H_2O$. The reactor conditions of the 10 invention favor these microbes and they tend to actually dominate the species found in the process of the invention, washing out methane formers and other undesirable organisms that produce odors. Moreover, any air bubbles in anaerobic reactor 16 have time to float to the top of anaerobic reactor 16 and are positioned to thereby flow into aerobic reactor 18 during the run cycle. The bacteria absorbs and metabolizes the majority of the phosphorus in the circulated wastewater. Recirculation further conditions the species of bacteria to develop and adapt to carrying a high phosphorus content (hpc).

This enables the effective removal of a large quantity of phosphorus from the circulated wastewater. Additionally, these hpc bacteria have increased energy available to absorb BOD constituents in the biomass later in the process. Cellular energy converts BOD to fat in anaerobic reactor 16 during the absorption and metabolism of phosphorus and this later stored energy is regenerated or made available when the bacteria enter aerobic reactors 18 and 20 where the fat is metabolized.

After anaerobic reactor 16 is closed off for about 10 minutes, valve 44G closes and valve 44F opens and the system is returned to the run cycle configuration. This process is repeated every ten minutes to increase the anaerobic decomposition rate of system 10. During the intermittent run cycles, the anaerobically treated wastewater is reintroduced into the circulating wastewater. This helps enhance the overall efficiency of system 10. After about 5 to about 50 passes through anaerobic reactor 16, the process of the present invention removes about 80% to about 90% of the combined nitrogen in the wastewater.

Figure 6:
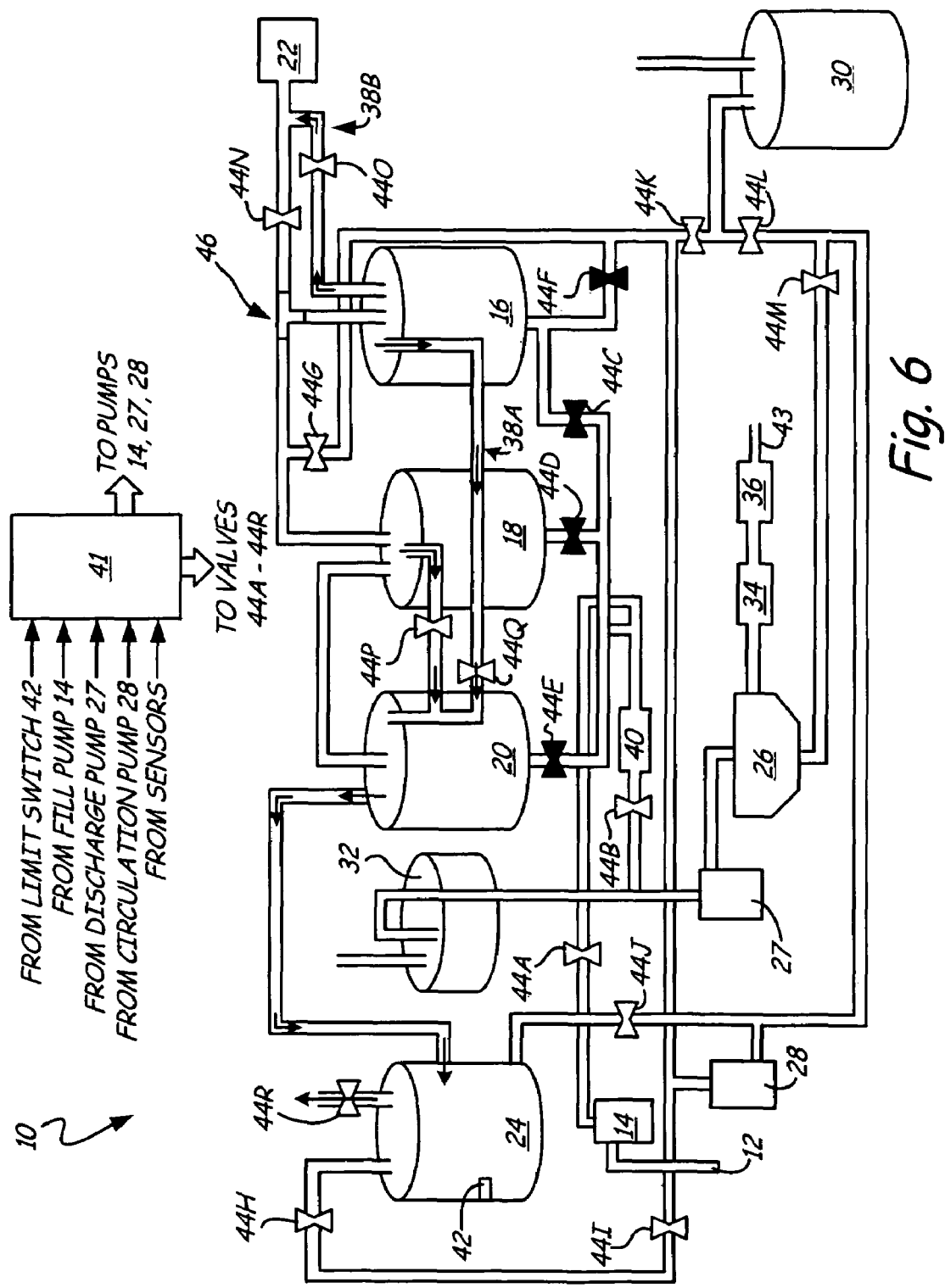
FIG. 6 is a diagram showing the de-gassing cycle of the wastewater treatment system.

FIG. 6 shows the de-gassing cycle of system 10. In one embodiment, excess gas is system 10, such as methane gas, is released through ventilation systems 38A and 38B and through vapor tank 24 during the de-gassing cycle. Exiting gas is shown in FIG. 6 with arrows. The de-gassing cycle slowly brings the system pressure down to atmospheric pressure. In one embodiment, pressure in system 10 is reduced slowly after a batch of wastewater has been processed. Once a batch of wastewater has been processed to the desired discharge BOD level, pressure is reduced over a period of time. In one embodiment, the air supply from compressor 22 is reduced as ventilation systems 38A and 38B and valve 44R are utilized to ramp down or slowly reduce the system 10 pressure. For example, pressure reduction can occur at a rate of about 1 to about 2 atmospheres of pressure per minute, until the pressure reaches an ambient level. Such pressure reduction further enhances nitrogen stripping. In one embodiment, complete processing of a batch occurs during each full process cycle, which lasts from about 8 hours to about 14 hours and preferably lasts about 10 hours.

Figure 7:
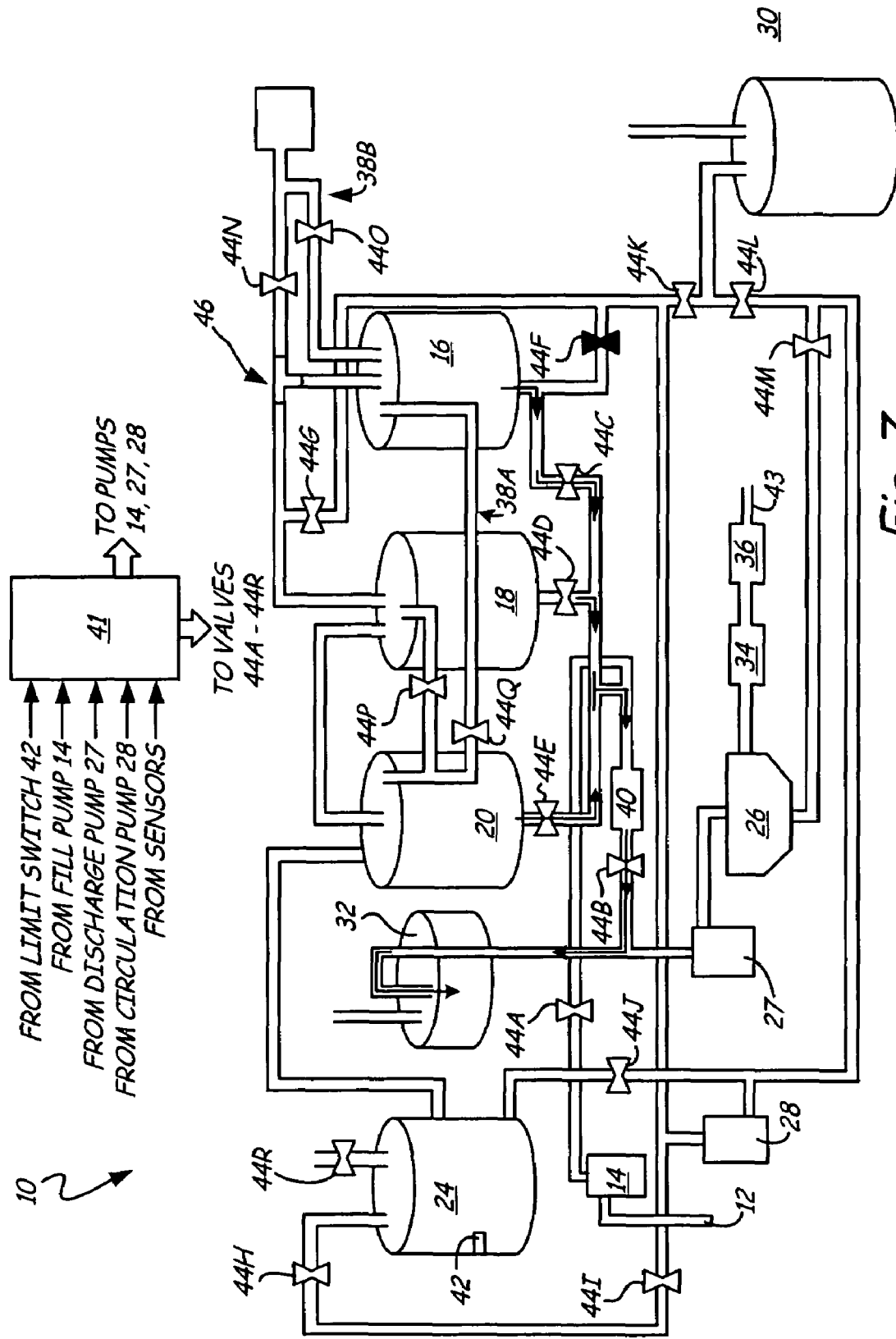
FIG. 7 is a diagram showing the system discharge portion of the discharge cycle of the wastewater treatment system.

FIG. 7 shows the system discharge portion of the discharge cycle of system 10. During the system discharge step, newly produced activated sludge that has collected in anaerobic reactor 16 and aerobic reactors 18 and 20 is emptied into surge tank 32. Discharged sludge is shown with arrows in FIG. 7. Valves 44C, 44D and 44E are opened and sludge is gravity fed into surge tank 32 through valve 44B. In one embodiment, valve 44C is opened for five seconds, followed in sequence by valves 44D and 44E. As the sludge moves into surge tank 32, it passes through filter 40. In one embodiment, filter 40 is a bar screen filter. Phosphorous and nitrogen compounds are predominantly contained in the solid fraction of the treated wastewater. Filter 40 screens out granules of phosphates, nitrates and ammonia that formed in the sludge during the anaerobic and aerobic reaction processes. The granules are removed at this point before entry into clarifier 26 and can be collected for other external applications, such as in fertilizers.

Sludge collected in surge tank 32 is allowed to settle. In one embodiment sludge settles for one hour. While sludge settles in surge tank 32, further anaerobic and aerobic reactions take place which further treat the wastewater.

Figure 8:
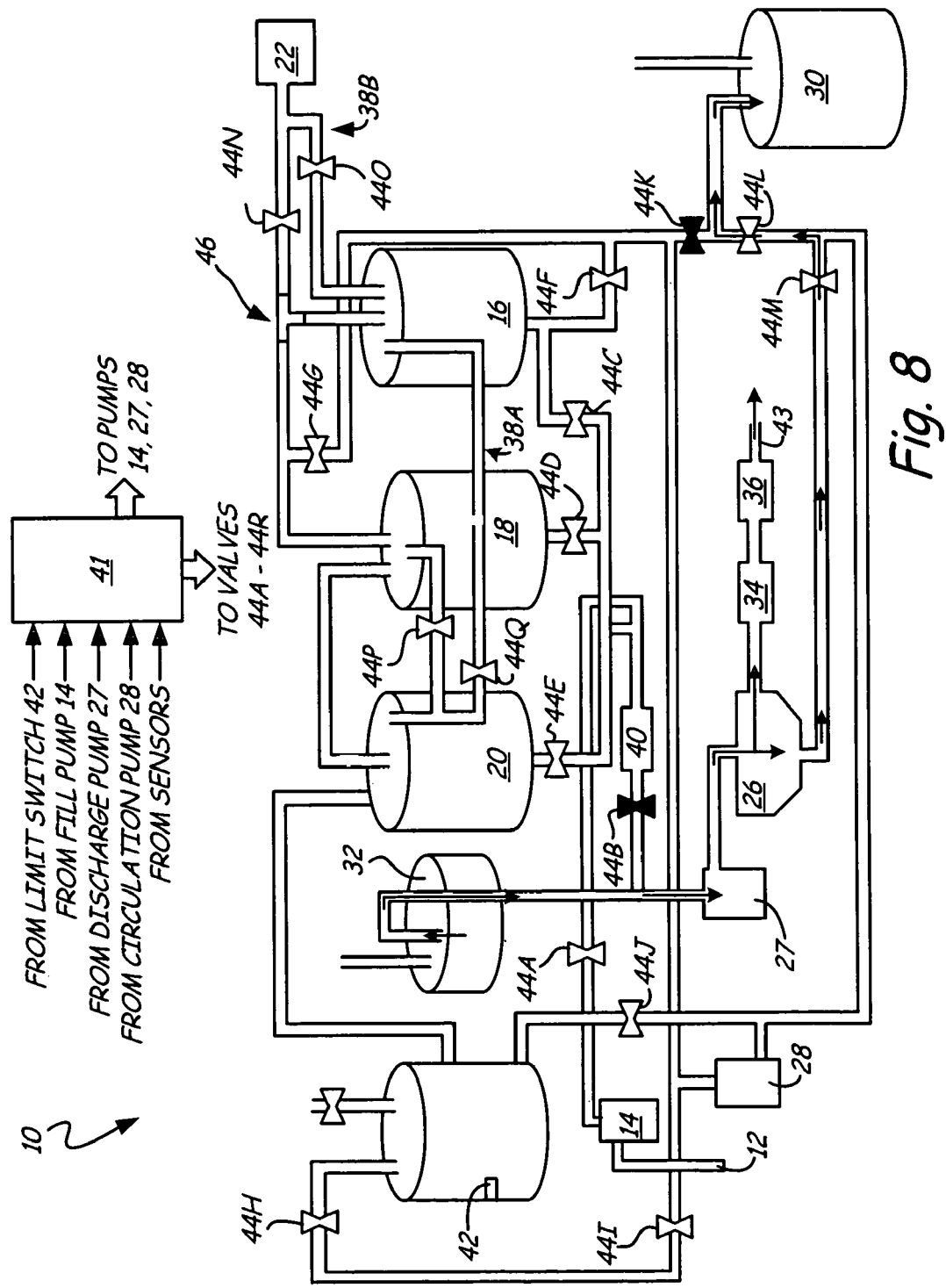
FIG. 8 is a diagram showing the sludge discharge portion of the discharge cycle of the wastewater treatment system.

FIG. 8 shows the sludge discharge step of the discharge cycle of system 10. Discharged sludge is shown with arrows in FIG. 8. During the sludge discharge step, sludge is pumped by pump 27 from surge tank 32 into clarifier 26. In one embodiment, pump 27 is a chopper pump which more finely divides any solids in the liquid effluent. Pump 27 has a low output rate and is activated alternately one hundred seconds on and four hundred seconds off. Suitable pumps can be obtained from Moyno, Inc., Springfield, Ohio.

Figure 9:
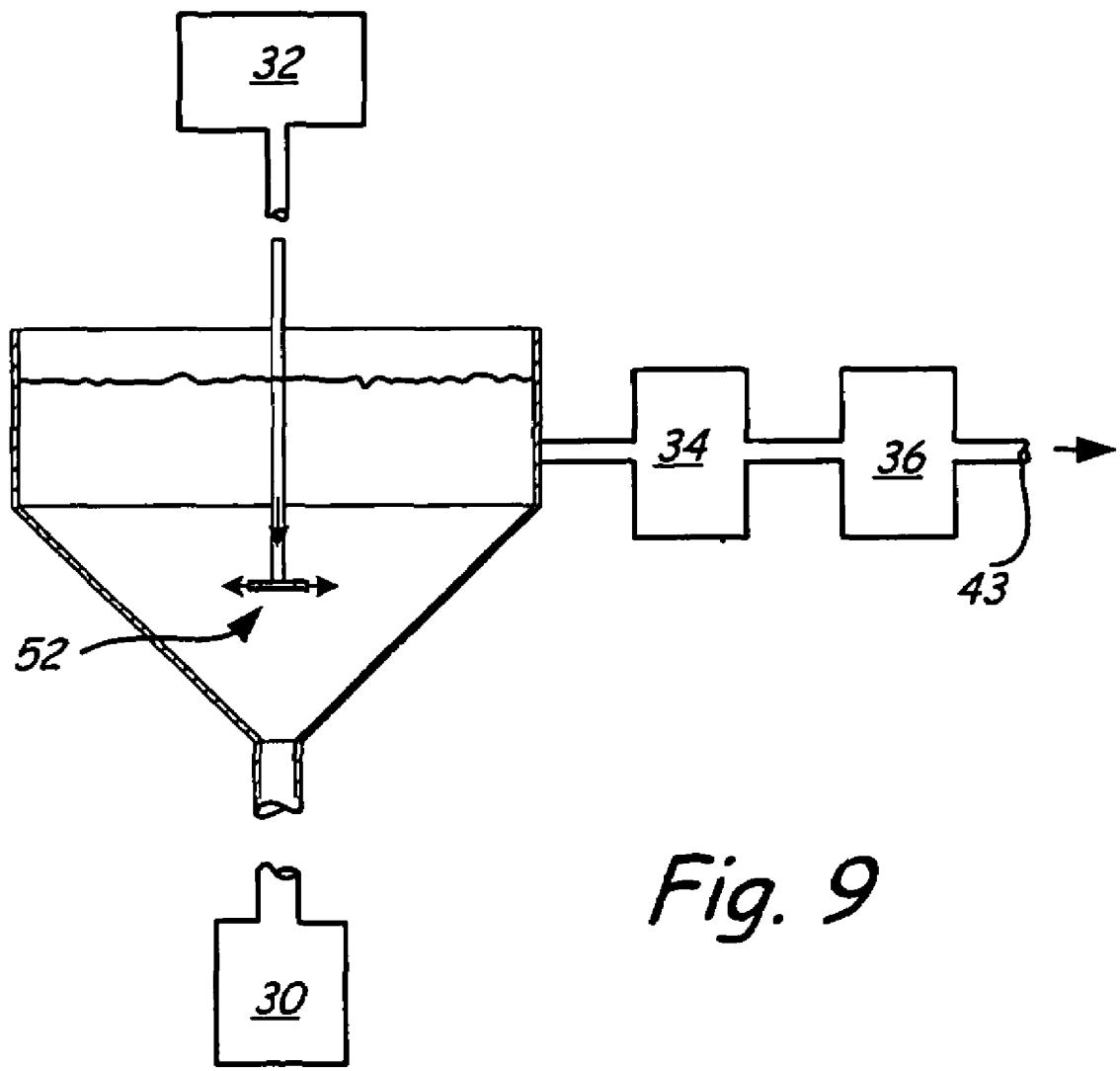
FIG. 9 is a diagram showing the clarifier elements of the wastewater treatment system of the present invention.

FIG. 9 shows clarifier 26 of system 10. In one embodiment, clarifier 26 includes weir ring 52 that separates solid and liquid portions of the treated wastewater. In one embodiment, weir ring 52 has a 6 inch diameter and ⅛ inch clearance between plates. In one embodiment, after the primarily liquid portion passes through the clarifier, it is further passed through a bar screen filter to screen out any solid particles larger than the 0.25 inch screen openings. Liquid portions are passed on to chlorinator 34 and dechlorinator 36 where the liquid is sanitized to be safely returned to the environment at exit 43. Suitable chlorination and dechlorination units can be obtained from PPG Industries, Inc., Pittsburgh, Pa.

Solid sludge portions are pumped from clarifier 26 to sludge tank 30 where the activated sludge can be reused to charge system 10 for later batch processing.

The operation and timing of valves 44A-44R, fill pump 26, discharge pump 27, circulation pump 28, vapor tank 24, air compressor 22 and other components of system 10 can be controlled using programable logic controls, a microprocessor-based control system or other such systems. The timing of the programming depends on the initial BOD level in the incoming wastewater. Higher BOD wastewater requires longer cycle times, as can be controlled with the PLC programming. In one embodiment, an oxygen demand sensor can be used in conjunction with PLC 41 to control the cycle times of system 10 based on the sensed BOD of the sensor. In one embodiment, system 10 operates for about ten hours. In a preferred embodiment, system 10 operates for about three to four hours.

Figure 10:
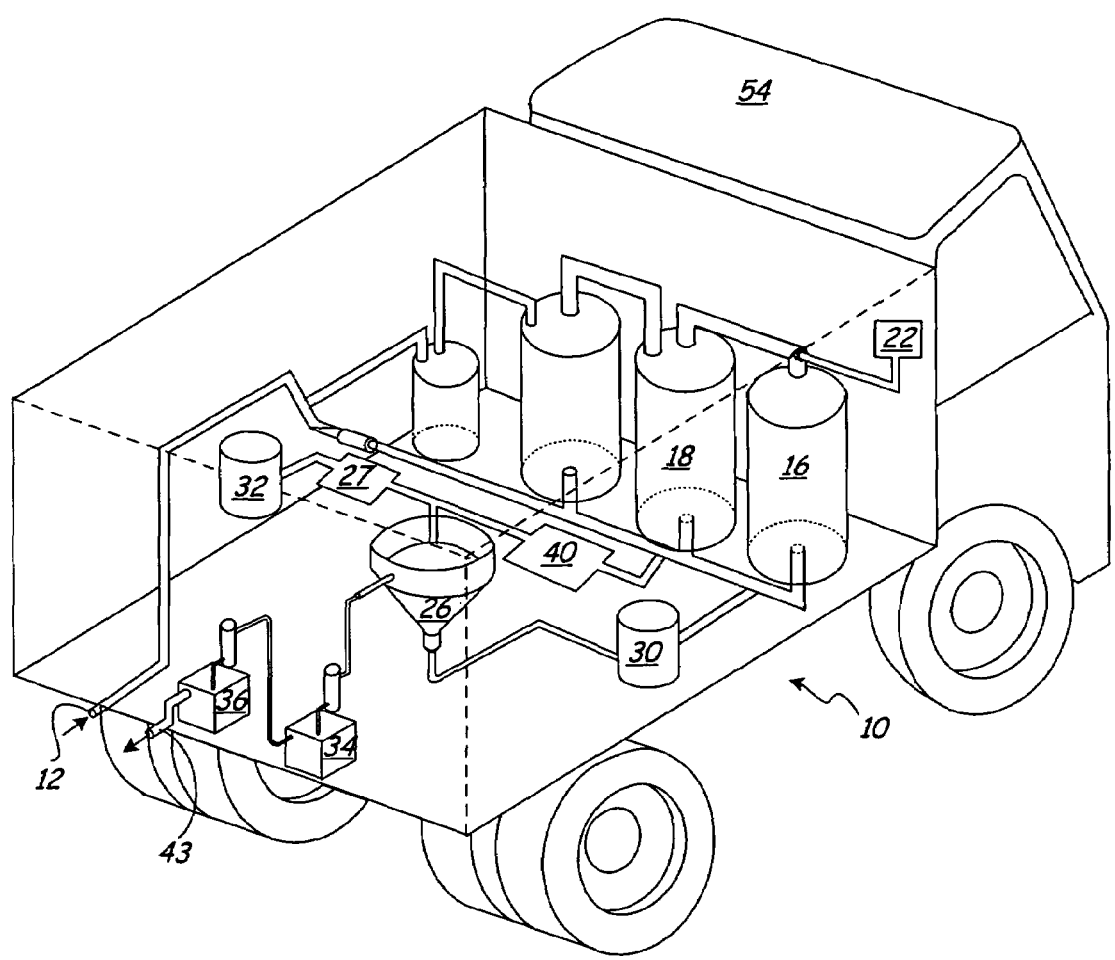
FIG. 10 shows one embodiment of the wastewater treatment system of the present invention as operable in a mobile transport vehicle.

FIG. 10 shows one embodiment of system 10 as operable in a mobile transport vehicle, such as truck 54. System 10 takes up very little space and reduces the land area needed for sewage or wastewater treatment. Influent wastewater can be introduced into system 10 at inlet 12. Clean wastewater leaves system 10 at exit 43. Also, by requiring only the net feed stream of fill pump 14 from inlet 12 to be pressurized and maintaining system pressure using air compressor 22, the power requirements of system 10 are minimized. In one embodiment, system 10 fits into a three-dimensional rectangular space having dimensions of about 18 feet long by about 8 feet wide by about 8 feet high and has a batch capacity of about 350 gallons. Thus, system 10 fits easily into portable truck 54 for high mobility. The modularity of system 10 allows more than one system 10 to service the needs of a particular community or application. In one embodiment, increased capacity is obtained by using a plurality of systems 10 in parallel; alternatively, system 10 is scaled up for such applications. In another embodiment, increased effectiveness is obtained by using a plurality of systems 10 in series. In an exemplary embodiment, the processing capacity of system 10 is sized so that it can accommodate expected flow input from the source to be treated. In one embodiment, increased capacity can be obtained for a particular system 10 by decreasing reaction or residence time, thereby slightly decreasing treatment effectiveness.

Although the present invention has been described with reference to preferred embodiments, workers skilled in the art will recognize that changes may be made in form and detail without departing from the spirit and scope of the invention.

The invention claimed is:

1. A system for treating wastewater, the system capable of removing granules from treated wastewater, the system comprising:

a source of activated sludge for promoting anaerobic and aerobic digestion of wastewater;

a compressor for supplying a volume of pressurized air for promoting aerobic digestion of wastewater;

at least one anaerobic reactor for anaerobically treating wastewater with the activated sludge;

at least one aerobic reactor connected in a circulation loop with the at least one anaerobic reactor for aerobically treating wastewater with the activated sludge and pressurized air, thereby producing additional activated sludge material containing granules;

a circulation pump for circulating wastewater through the circulation loop of the system;

a pressure control system for regulating pressure in the system;

a discharge system connected to the at least one anaerobic reactor and the at least one aerobic reactor for removing treated wastewater and activated sludge from the at least one anaerobic reactor and the at least one aerobic reactor, the discharge system comprising:

a clarifier for receiving wastewater and activated sludge from the at least one anaerobic and the at least one aerobic reactors and separating the wastewater from the activated sludge such that the wastewater is removed from the system and the activated sludge is returned to the source of activated sludge; and a filter positioned between the at least one aerobic and the at least one anaerobic reactors and the clarifier for removing the granules from the additional activated sludge.

2. The system of claim 1 wherein the filter is a bar screen filter for removing granules of phosphates, nitrates and ammonia from the additional activated sludge.

3. The system of claim 2 wherein the bar screen filter separates granules having a diameter of about 0.125 inch to about 0.25 inch.

4. The system of claim 1 wherein the discharge system includes a surge tank comprising:

an inlet for receiving activated sludge and wastewater from the filter to further anaerobically and aerobically treat the wastewater within the surge tank; and an outlet for passing activated sludge and wastewater to the clarifier.

5. The system of claim 4 wherein the filter is located with respect to the flow of the activated sludge, between the at least one anaerobic and the at least one aerobic reactors, and the surge tank.

6. The system of claim 5 wherein the activated sludge material is gravity fed into the surge tank through the discharge system such that the activated sludge material passes through the filter.

7. The system of claim wherein the pressure control system comprises a vapor tank connected in series with the at lest one anaerobic reactor and the at least one aerobic reactor in the circulation loop, the vapor tank comprising:

a limit switch for limiting wastewater intake into the system; and pressure valve for maintaining a pressure of the system.

8. The system of claim 7 and further comprising:

circulation piping for connecting the vapor tank, the at least one anaerobic reactor and the at least one aerobic reactor in series within the circulation loop;

bypass piping connected to the circulation Piping for bypassing the at least one anaerobic reactor within the circulation loop; and valves and pumps for controlling flow of the wastewater through the system and intermittently directing wastewater and activated sludge through the bypass piping within the circulation loop.

9. The system of claim 8 wherein the valves and pumps are controlled by a programmable logic controller.

10. The system of claim 1 wherein the clarifier of the discharge system comprises a weir ring.

11. The system of claim 1 and further comprising a ported injector positioned between the at least one anaerobic reactor and the at least one aerobic reactor for introducing a volume of pressurized air into the circulating wastewater from the compressor.

12. The system of claim 11 wherein the ported injector includes a region having multiple holes.

13. The system of claim 12 wherein the multiple holes of the region of the injector each have a diameter of about 0.125 inch.

14. The system of claim 11 wherein the volume of pressurized air is introduced into the circulated wastewater after the wastewater passes through an anaerobic reactor.

15. The system of claim 6 wherein the discharge system for removing treated wastewater and activated sludge from the at least one aerobic and the at least one anaerobic reactor comprises a valve positioned between each of the at least one anaerobic and the at least one aerobic reactors and the surge tank.

16. The system of claim 15 wherein the discharge system further comprises a discharge pump for moving wastewater and activated sludge from the surge tank to the clarifier.

* * * * *

UNITED STATES PATENT AND TRADEMARK OFFICE
CERTIFICATE OF CORRECTION

| | | |
|---|---|---|
| PATENT NO. | : 7,527,735 B2 | Page 1 of 1 |
| APPLICATION NO. | : 11/507124 | |
| DATED | : May 5, 2009 | |
| INVENTOR(S) | : Craig S. Brase | |

It is certified that error appears in the above-identified patent and that said Letters Patent is hereby corrected as shown below:

Col. 1, line 44 - Delete "maybe" in the phrase "material maybe bio-" and insert --may be--.

Col. 7, line 57 - Delete "10" in the phrase "the 10 invention".

Col. 10, line 54 - Insert --6-- into the middle of the phrase "claim wherein" such that claim 7 depends from claim 6.

Col. 10, line 60 - Insert --a-- before the phrase "pressure valve".

Col. 10, line 65 - Delete "Piping" and insert --pinping-- into the phrase "circulation piping for".

Signed and Sealed this

Twenty-fourth Day of August, 2010

David J. Kappos
*Director of the United States Patent and Trademark Office*